United States Patent
Fujita

(10) Patent No.: US 10,928,967 B2
(45) Date of Patent: Feb. 23, 2021

(54) INFORMATION PROCESSING APPARATUS, NON-TRANSITORY COMPUTER-READABLE RECORDING MEDIUM, AND CONTROL METHOD

(71) Applicant: FUJITSU COMPONENT LIMITED, Tokyo (JP)

(72) Inventor: Kenichi Fujita, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/680,856

(22) Filed: Nov. 12, 2019

(65) Prior Publication Data

US 2020/0183540 A1    Jun. 11, 2020

(30) Foreign Application Priority Data

Dec. 7, 2018    (JP) .............................. JP2018-230073

(51) Int. Cl.
*G06F 3/044*    (2006.01)

(52) U.S. Cl.
CPC .. *G06F 3/0447* (2019.05); *G06F 2203/04104* (2013.01)

(58) Field of Classification Search
CPC ................. G06F 2203/04104; G06F 3/0447
See application file for complete search history.

(56) References Cited

U.S. PATENT DOCUMENTS

| 2005/0106538 | A1* | 5/2005 | Freeman | G09B 7/00 434/167 |
| 2011/0057896 | A1* | 3/2011 | Baek | G06F 3/04886 345/173 |
| 2013/0082976 | A1* | 4/2013 | Kang | G06F 3/0488 345/174 |
| 2015/0309597 | A1* | 10/2015 | Fujii | G06F 3/0412 345/173 |
| 2016/0070371 | A1* | 3/2016 | Oonishi | G06F 3/0412 345/174 |

FOREIGN PATENT DOCUMENTS

| JP | 2010-211264 | 9/2010 |
| JP | 2017-117014 | 6/2017 |

* cited by examiner

*Primary Examiner* — Muhammad N Edun
(74) *Attorney, Agent, or Firm* — Staas & Halsey LLP

(57) ABSTRACT

An information processing apparatus includes: a touch panel; a memory; a first processor coupled to the memory and the first processor configured to: acquire coordinates of touch input in an input surface of the touch panel; determine a direction of the touch input and a movement distance from a start point to an end point of the touch input; and determine an operation content with respect to the touch panel based on at least one of the direction and the movement distance of the touch input.

7 Claims, 11 Drawing Sheets

TABLE

| TARGET POINT NUMBER | Px | Py | INPUT RANGE |
|---|---|---|---|
| #1 | Xp[1] | Yp[3] | .... |
| #2 | Xp[2] | Yp[3] | .... |
| #3 | Xp[3] | Yp[3] | .... |
| #4 | Xp[1] | Yp[2] | .... |
| #5 | Xp[2] | Yp[2] | .... |
| #6 | Xp[3] | Yp[2] | .... |
| #7 | Xp[1] | Yp[1] | .... |
| #8 | Xp[2] | Yp[1] | .... |
| #9 | Xp[3] | Yp[1] | .... |

(12) United States Patent

INFORMATION PROCESSING APPARATUS, NON-TRANSITORY COMPUTER-READABLE RECORDING MEDIUM, AND CONTROL METHOD

CROSS-REFERENCE TO RELATED APPLICATION

This application is based upon and claims the benefit of priority of the prior Japanese Patent Application No. 2018-230073 filed on Dec. 7, 2018, the entire contents of which are incorporated herein by reference.

FIELD

A certain aspect of the embodiments is related to an information processing apparatus, a non-transitory computer-readable recording medium, and a control method.

BACKGROUND

For example, there are notebook type personal computers and portable game machines each of which has a touch panel, and detects input coordinates of touch input (e.g. see Patent Document 1: Japanese Laid-open Patent Publication No. 2010-211264, and Patent Document 2: Japanese Laid-open Patent Publication No. 2017-117014). In a resistive film type touch panel, the input coordinates are detected based on potentials between the resistive films of the touch panel.

Since equipotential lines in a resistive film are distorted due to the influence of resistance values of electrodes, an error may occur between the detected input coordinates and the actual coordinates of a pressed point. Therefore, the input coordinates are corrected by a correction value obtained by adjustment work.

In the adjustment work of the touch panel, a plurality of target points which are target for touch input are displayed on a monitor. Since an error between the display coordinates of a target point and the detected input coordinates varies depending on a position in an input surface, the target points are arranged so as not to be uneven in the input surface. When a user touches each target point, the correction value is calculated based on deviation between the input coordinates and the display coordinates of the target point.

SUMMARY

According to a first aspect of the present invention, there is provided an information processing apparatus including: a touch panel; a memory; a first processor coupled to the memory and the first processor configured to acquire coordinates of touch input in an input surface of the touch panel; determine a direction of the touch input and a movement distance from a start point to an end point of the touch input; and determine an operation content with respect to the touch panel based on at least one of the direction and the movement distance of the touch input.

According to a second aspect of the present invention, there is provided a non-transitory computer-readable recording medium storing a program that causes a computer to execute a process, the computer including a touch panel, a monitor overlapping the touch panel, and a controller acquiring coordinates of touch input in an input surface of the touch panel, the process including: selecting a single target point from a plurality of target points for coordinate correction to display the selected target point on the monitor; and causing the controller to acquire the coordinates of the touch input corresponding to the selected target point, or changing selection of the target point, based on at least one of a direction and a movement distance of the touch input corresponding to the selected target point.

According to a third aspect of the present invention, there is provided a control method of controlling a computer, the computer including a touch panel, a monitor overlapping the touch panel, and a controller acquiring coordinates of touch input in an input surface of the touch panel, the method including: selecting a single target point from a plurality of target points for coordinate correction to display the selected target point on the monitor; and causing the controller to acquire the coordinates of the touch input corresponding to the selected target point, or changing selection of the target point, based on at least one of a direction and a movement distance of the touch input corresponding to the selected target point.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In adjustment work, when an error between input coordinates and coordinates of a target point exceeds a specified range, it is determined that the input is incorrect and it is required to touch the same target point again.

In order that the input coordinates can be corrected within a range that causes no trouble practically even in the case of a touch panel with large distortion of the equipotential lines in order to improve the yield of the touch panel, there is a case where the specified range for determining that the touch input is normal is widely set. In this case, even when the user erroneously performs the touch input at a position away from the target point, it is determined that the touch input is normal if the input coordinates are within the specified range, and the touch input is not required again.

Since the correction value for correcting the input coordinates is calculated based on the coordinates of the touch input at the time of the adjustment work, when the touch input is performed at a position away from the target point, the correction value larger than a value corresponding to the distortion of the equipotential lines is calculated, and the correction accuracy of the input coordinates may be reduced more. Therefore, when the user performs erroneous touch input, the user operates an operation means other than the touch panel such as a keyboard, and selects the target point where the erroneous touch input has been performed again to redo the touch input.

However, when a device has no operation means other than the touch panel like a tablet terminal, the user cannot select again the target point in which the touch input has been completed, and cannot redo the touch input. Therefore, once the user has completed the touch input of all target points, it is necessary to redo the adjustment work from the beginning and perform the touch input to all target points again, which is troublesome.

For other purposes, there are many cases where a device having no input means other than the touch panel has to determine user's operation content and user's operation intention based on only the operation of the touch panel. However, the conventional apparatus is hard to determine the user's operation intention based on only the operation of the touch panel, and there is a possibility that the processing which the user does not intend is performed.

It is an object of the present disclosure to provide an information processing apparatus, a non-transitory computer-readable recording medium, and a control method that can easily determine user's operation content and user's operation intention based on the input operation from the touch panel, and can improve convenience of an adjustment work of the touch panel.

Figure 1:
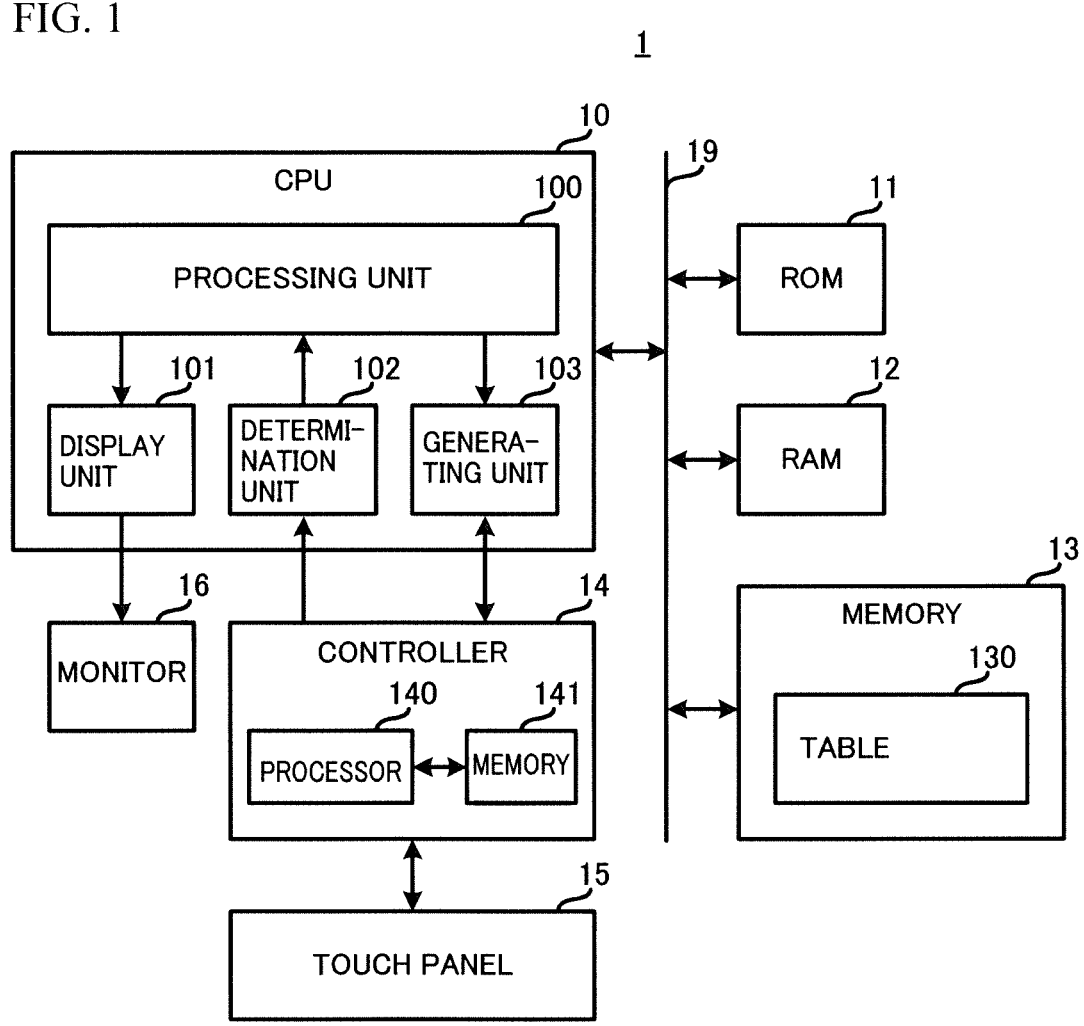
FIG. 1 illustrates the configuration of an information processing apparatus.

FIG. 1 illustrates an example of the configuration of an information processing apparatus 1. An information processing apparatus 1 is a tablet terminal, for example, but is not limited to the tablet terminal.

The information processing apparatus 1 includes a central processing unit (CPU) 10, a read only memory (ROM) 11, a random access memory (RAM) 12, a memory 13, a controller 14, a touch panel 15 and a monitor 16. The CPU 10 is connected to the ROM 11, the RAM 12 and the memory 13 via a bus 19.

The CPU 10 is an example of a computer that executes a control program. The ROM 11 stores programs to be executed by the CPU 10. The programs include an operating system (OS), the control program, and an application using the touch panel 15. The RAM 12 is a working memory for the CPU 10.

The touch panel 15 receives touch input on an input surface. The touch panel 15 is not limited to a resistive film type touch panel, and may be another type such as an electrostatic capacitance type touch panel.

The controller 14 detects the touch input to the touch panel 15. When the touch panel 15 is the resistive film type touch panel, the controller 14 detects input coordinates based on potentials between the resistive films.

Since the equipotential lines in the resistive film are distorted due to the resistance values of the electrodes provided at ends of the resistive film, an error occurs between the detected input coordinates and the actual coordinates of the pressed point. Therefore, the controller 14 corrects the input coordinates with a correction coefficient obtained by the adjustment work of the touch panel in advance.

The controller 14 includes a memory 141, and a processor 140 that execute various processes such as detection of the input coordinates, calculation of the correction coefficient, and correction of the input coordinates. The processor 140 switches an operation mode of the controller 14 to a normal mode or an adjustment mode by cooperating with the CPU 10. The processor 140 may be a CPU, but is not limited to the CPU.

In the adjustment mode, the processor 140 calculates a correction coefficient from each of the input coordinates corresponding to a plurality of target points according to a command from the CPU 10. The processor 140 transmits input information indicating the detected input coordinates to the CPU 10. The input coordinates include coordinates (X1, Y1) of a start point of the touch input and coordinates (X2, Y2) of an end point of the touch input. The start point indicates a position at which the touch on the input surface is started, the end point indicates a position at which a finger or the like is separated from the input surface, and a distance between the start point and the end point corresponds to a movement distance of the finger.

The controller 14 calculates a correction coefficient for correcting the input coordinates based on the coordinates of the touch input. The correction coefficient is appropriately calculated according to a characteristic of the touch panel 15 and the like. The controller 14 is an example of a calculator. In the adjustment mode, the processor 140 does not correct the input coordinates. In the normal mode in which the touch panel 15 is used for information input, the processor 140 corrects the coordinates of the touch input based on the correction coefficient, and transmits the corrected input coordinates to the CPU 10.

The monitor 16 is, for example, a liquid crystal display, and displays image information input from the CPU 10. The monitor 16 is provided so as to overlap the input surface of the touch panel 15, and the user can view a screen of the monitor 16 through the touch panel 15.

When the CPU 10 reads the program from the ROM 11, the CPU 10 realizes a processing unit 100, a display unit 101, a determination unit 102, and a generating unit 103 as functions. Further, the memory 13 stores a table 130 in which target point information is recorded.

The CPU 10 is an example of a controller, and controls the controller 14 and the monitor 16 according to the control program. The processing unit 100 inputs and outputs various types of information to/from the display unit 101, the determination unit 102, and the generating unit 103 to execute a sequence of the adjustment work of the touch panel 15.

The processing unit 100 defines a plurality of target points which are targets of the touch input in the adjustment work based on information stored in the table 130. The processing unit 100 sequentially selects the target point and notifies the display unit 101 and the generating unit 103 of the selected target point.

The display unit 101 displays the target point notified from the processing unit 100 on the monitor 16. In the following example, the display unit 101 displays one target point on the monitor 16 at a time, but two or more target points may be displayed simultaneously when the touch panel 15 supports multi-touch input.

The determination unit 102 receives the input information indicating the coordinates of the touch input corresponding to the displayed target point from the controller 14. The determination unit 102 calculates the movement distance from the start point to the end point of the touch input based on the input information, and determines the operation content of the touch input based on the movement distance. When the movement distance is shorter than a threshold value, the determination unit 102 determines that a touch operation is performed on the target point. On the contrary, when the movement distance is longer than the threshold value in the horizontal direction or vertical direction (an X direction or a Y direction) of the input surface, the determination unit 102 determines that a change operation for changing the target point is performed according to the movement direction.

When the movement distance is longer than the threshold value in both of the horizontal direction and the vertical direction of the input surface, the determination unit 102 determines that a stop operation for stopping the adjustment work is performed. As long as the movement distance in both directions is longer than the threshold value, the operation method is not limited to a specific operation method, such as an operation of moving the touch input in any one of the horizontal direction or vertical direction and then moving the touch input in the other direction, or an operation of moving the touch input in an oblique direction. Other operation may be used as conditions for the stop operation determination. The determination unit 102 notifies the processing unit 100 of a determination result of the operation content.

The processing unit 100 outputs an instruction corresponding to the determination result of the determination unit 102 to the generating unit 103. The generating unit 103 generates commands and outputs the commands to the controller 14. The generating unit 103 transmits a start command to the controller 14 to instruct the controller 14 to start the adjustment mode.

When the touch operation is performed, the generating unit 103 transmits an acquisition command to the controller 14 to instruct acquisition of the input coordinates. On the other hand, when the change operation is performed, the generating unit 103 suspends the transmission of the acquisition command. Even if the touch input is performed, the controller 14 does not record the input coordinates in the memory 141 when the acquisition command is not received. Further, when the stop operation is performed, the generating unit 103 transmits a termination command to the controller 14 to instruct the termination of the adjustment mode.

When the change operation is performed, the processing unit 100 selects another target point according to the movement direction of the touch input. The display unit 101 stops the display of the current target point and displays a newly selected target point on the monitor 16 according to the instruction of the processing unit 100.

Since the CPU 10 determines the operation content of the touch input based on the direction and the movement distance of the touch input, it is possible to easily understand the intention of the user's operation, that is, the distinction between the touch operation, the change operation, and the stop operation in this embodiment. For example, since the change operation for changing the target point can be received from the touch panel 15, the user can redo the touch input to the same target point without using the operation means other than the touch panel 15 when the touch input is mistaken. In this case, the display unit 101 can change a display form such as, for example, a display color or a display shape of the target point from the initial touch input so that the user can easily recognize that the touch input is redone.

The CPU 10 reads the table 130 to acquire display coordinates of each target point. The table 130 may be stored in the memory 13 in advance or may be generated by the CPU 10 according to the control program.

Figures 2A, 2B:
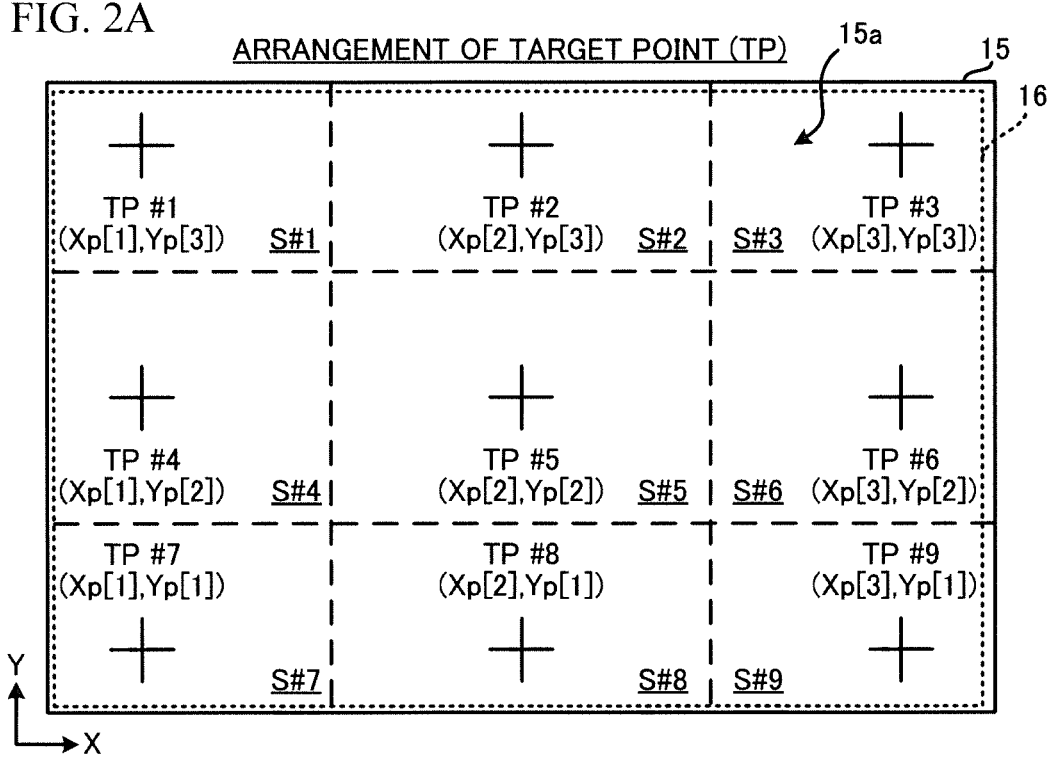
FIG. 2A illustrates the arrangement of target points.
FIG. 2B illustrates a table in which target point information is recorded.

FIG. 2A illustrates the arrangement of the target points, and FIG. 2B illustrates the table 130. For example, nine target points #1 to #9 are defined on an input surface 15a of the touch panel 15 based on the display coordinates stored in the table 130. The number of target points is not limited to nine. The target points #1 to #9 are arranged, for example, at equal intervals so as not to be unevenly distributed in the input surface 15a.

The input surface 15a is a surface which the user touches with a finger or a touch pen. The display unit 101 displays each target point #1 to #9 as a cross mark at a corresponding position of the monitor 16. Hereinafter, a long side direction of the input surface 15a is defined as the X direction, and a short side direction is defined as the Y direction.

In the table 130, display coordinates (Px, Py) and input ranges corresponding to the target point numbers #1 to #9 are registered. Each input range indicates the range of each of regions S #1 to S #9 including target points #1 to #9 obtained by dividing the input surface 15a by boundary lines (see dotted lines). Each boundary line passes through a midpoint between two adjacent target points in the X direction and the Y direction, for example.

The target points #1 to #9 are arranged on the same line in the X direction or the Y direction every three target points. The X-coordinate Px of the target points #1 to #9 is one of three predetermined values Xp[1] to Xp[3], and the Y-coordinate Py of the target points #1 to #9 is one of three predetermined values Yp[1] to Yp[3]. The X-coordinates Px of the target points #1, #4 and #7 are Xp [1], and the Y-coordinates Py of the target points #1 to #3 are Yp [3]. Here, the relationship of Xp [1]<Xp [2]<Xp [3] and Yp [1]<Yp [2]<Yp [3] is established.

The input range is registered in the table 130 as a range of the X-coordinates and the Y-coordinates of each of the regions S #1 to S #9. Coordinates of facing corners of the rectangle defining each region S #1 to S #9 may be registered as the input range.

Next, a description will be given of the operation of the information processing apparatus 1 in the adjustment work of the touch panel 15.

Figure 3A:
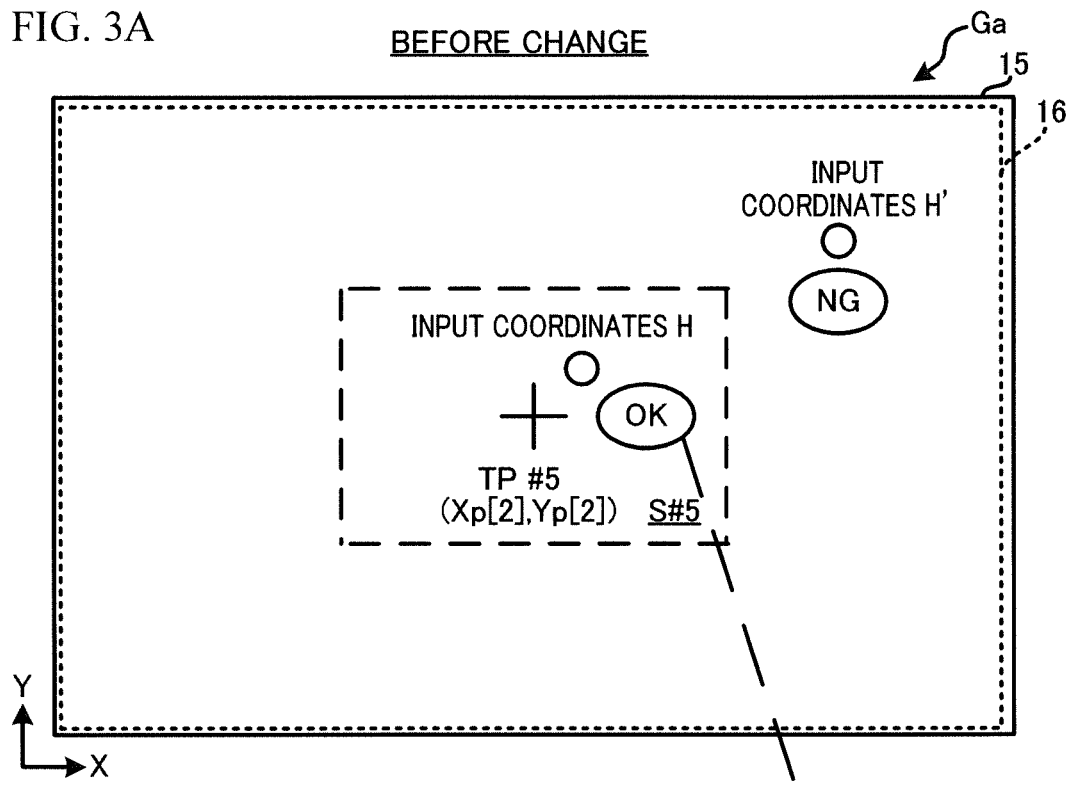
FIGS. 3A and 3B illustrates a change in display of a target point by touch input.
Figure 3B:
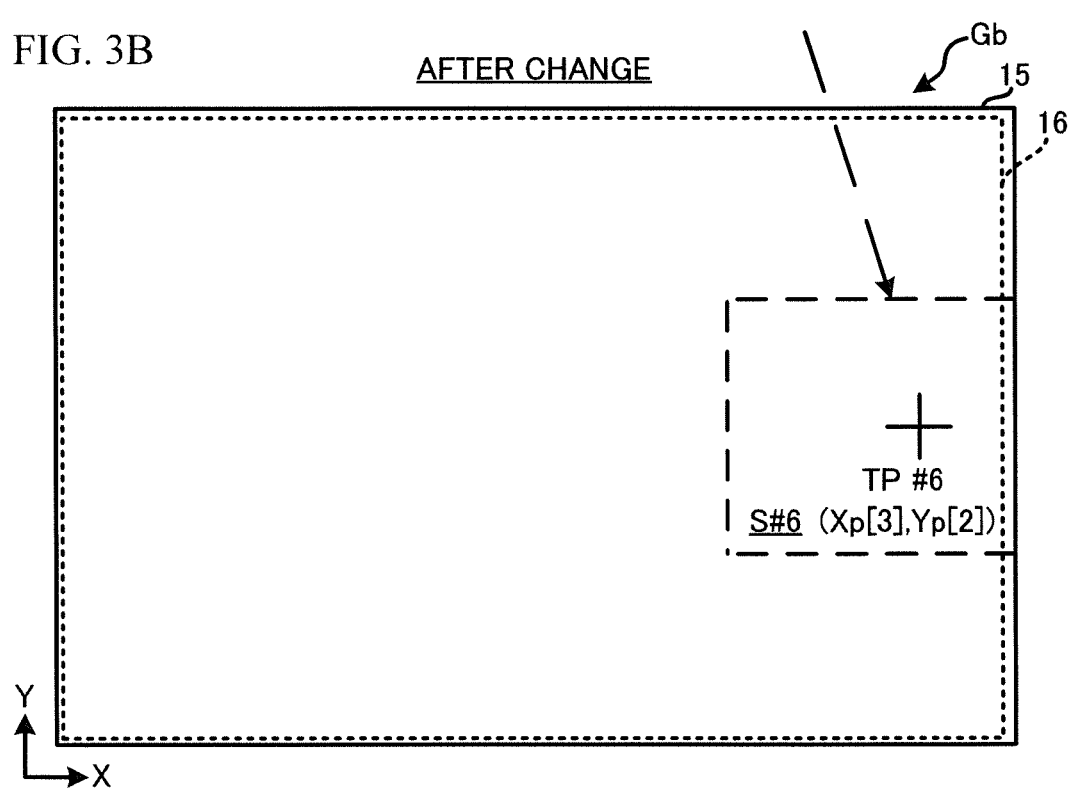

FIGS. 3A and 3B illustrates a change in display from a target point #5 to a target point #6. In FIGS. 3A and 3B, the same elements as in FIG. 2A are denoted by the same reference numerals, and description thereof is omitted.

A mark Ga indicates the screen of the monitor 16 on which the target point #5 before the change is displayed. A mark Gb indicates the screen of the monitor 16 on which the target point #6 after the change is displayed. When there is no change operation, the display unit 101 displays the target points #1 to #9 in order of number.

When the touch input of the target point #4 is completed, the display unit 101 then displays the target point #5 on the monitor 16 in order for the adjustment of the target point #5 as shown in the mark Ga. The user performs the touch input with the target point #5 as a target. The determination unit 102 determines the movement distance of the touch position from the start point to the end point of the touch input corresponding to the target point #5. When the movement distance is smaller than a predetermined value in each of the X direction and the Y direction, the determination unit 102 determines that the touch input is the touch operation with respect to the target point #5.

The determination unit 102 determines whether the position of the touch input is within the region S #5. When the input coordinates of the touch input are H, the determination unit 102 determines that the touch input is normal touch input (OK) with respect to the target point #5 since the position of the touch input is within the region S #5. When the input coordinates of the touch input are H', the determination unit 102 determines that the touch input is abnormal touch input (NG) since the position of the touch input is outside the region S #5.

When the touch input is normal, the generating unit 103 generates the acquisition command including the target point number "#5" and transmits it to the controller 14. The controller 14 stores the input coordinates H in the memory 141 as the input coordinates of the target point #5 indicated by the acquisition command. The display unit 101 displays the next target point #6 on the monitor 16 as indicated by the mark Gb.

In this manner, the CPU 10 sequentially selects the single target point from the plurality of target points #1 to #9 and displays the selected target point on the monitor 16. When the touch input is normal, the CPU 10 causes the controller 14 to acquire the input coordinates corresponding to the selected target point. The controller 14 can calculate the correction coefficient from the input coordinates for each of the target points #1 to #9. The correction coefficient is an example of a correction value of the coordinates of the touch input.

When the touch input is abnormal, the display unit 101 continues to display the target point #5, and the generating unit 103 does not transmit the acquisition command to the controller 14. For this reason, the controller 14 does not store the input coordinates H' in the memory 141 even if detecting the input coordinates H'.

When the touch input is outside the input range, the controller 14 does not acquire the input coordinates. Therefore, even if the user erroneously touches a position away from any target point, the controller 14 does not use the input coordinates in order to calculate the correction coefficient.

Even when the user performs the touch input within the input range, the user may move the touch input in the X direction or Y direction by the movement distance equal to or greater than the predetermined value to change the target point to be selected and redo the touch input, when the user made an incorrect touch input or an unintended touch input.

Figure 4A:
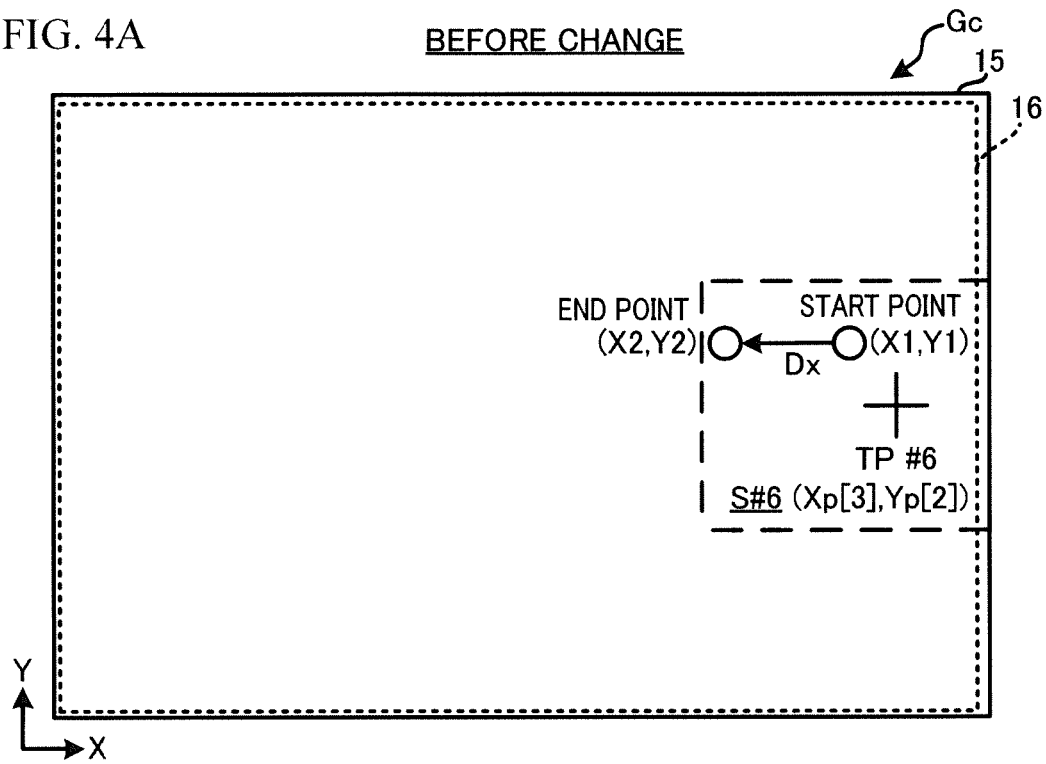
FIGS. 4A and 4B illustrates an operation for changing the target point in an X direction.
Figure 4B:
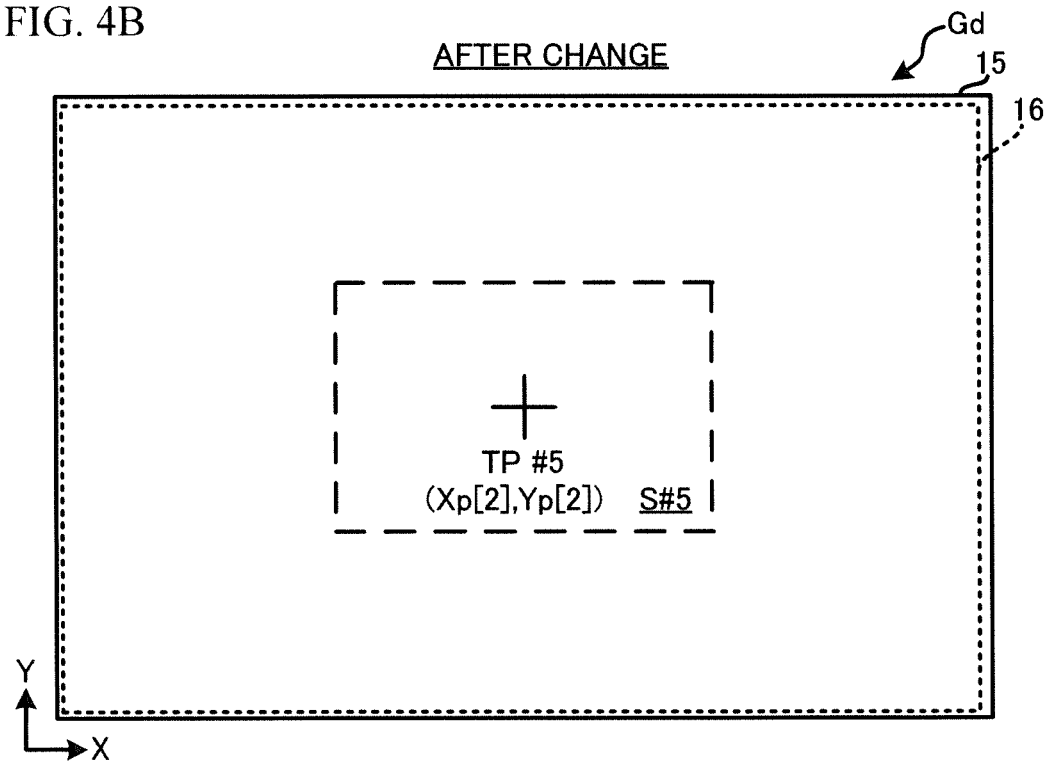

FIGS. 4A and 4B illustrates an operation for changing the target point in the X direction. In FIGS. 4A and 4B, the same elements as in FIG. 2A are denoted by the same reference numerals, and description thereof is omitted. A mark Gc indicates the screen of the monitor 16 displaying the target point #6 before the change of the target point. A mark Gd indicates the screen of the monitor 16 displaying the target point #5 after the change of the target point. An arrow extending from the start point to the end point represents a locus of the touch input.

After the touch input of the target point #5, the target point #6 is displayed on the monitor 16. In a case where the touch input of the target point #5 is to be redone in this state, an operation for redisplaying the target point #5 is performed. In FIG. 4A, the user moves the finger from the region S #6 in a −X direction, since the target point #5 is adjacent to a −X side of the target point #6.

The determination unit 102 calculates a movement distance Dx in the X direction (hereinafter referred to as "an X distance") and a movement distance Dy in the Y direction (hereinafter referred to as "a Y distance") between the coordinates (X1, Y1) of the start point of the touch input and the coordinates (X2, Y2) of the end point. When the X distance Dx is equal to or greater than the predetermined value, the determination unit 102 determines that this operation is not the touch operation with respect to the target point #6 but the operation for changing the target point #6 to the target point positioned in the X direction. In the example of FIG. 4A, the determination unit 102 determines that the target point after the change is the target point #5 adjacent to the −X side of the target point #6, since the coordinate X2 is smaller than the coordinate X1. In the example of FIG. 4A, the Y distance is substantially zero.

After this determination, the display unit 101 deletes the displayed target point #6 and displays the target point #5. At this time, the display unit 101 changes the display color of the target point #5 from the previous display color, since the target point #5 to be displayed is the target point at which the touch input has been completed once. Therefore, the user can recognize the redo of the touch input based on the change of the display color.

The generating unit 103 transmits the acquisition command including the target point number "#5" to the controller 14 according to the result of the touch input, so that the generating unit 103 causes the controller 14 to acquire the coordinates of the touch input of the target point #5 selected again. Therefore, the user can redo the touch input of the target point #5 and perform the adjustment work of the target point #5 again.

In the example shown in FIGS. 4A and 4B, the touch input is moved in the −X direction (X2<X1), and the target point is changed to another target point adjacent to the −X side thereof. However, by moving the touch input in the +X direction (X2>X1), the target point to be displayed can be changed to another target point adjacent to the +X side thereof. For example, when the touch input with respect to the target point #5 moves in the +X direction, the target point #6 located in the +X direction is selected. In this case, the touch input of the target point #6 is not completed, and the display color of the target point #6 is therefore not changed.

When the movement direction of the touch input is the Y direction, it is possible to change the target point in the same way.

Figure 5A:
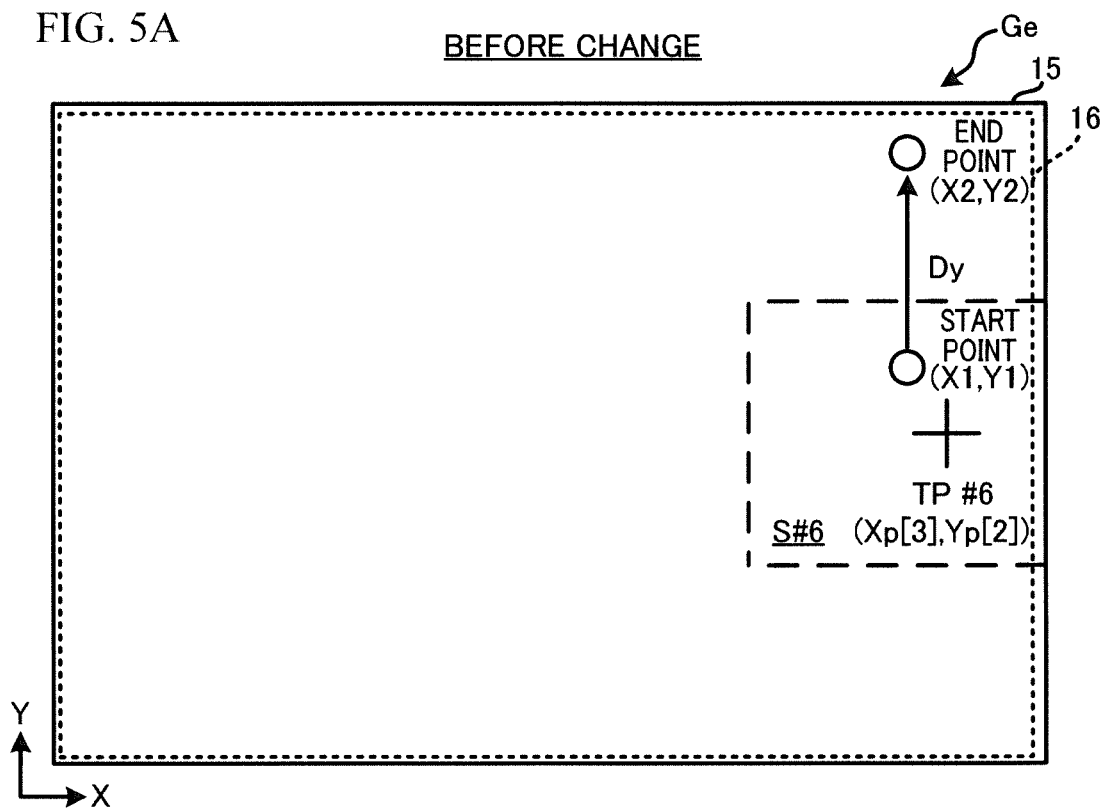
FIGS. 5A and 5B illustrates an operation for changing the target point in a Y direction.
Figure 5B:
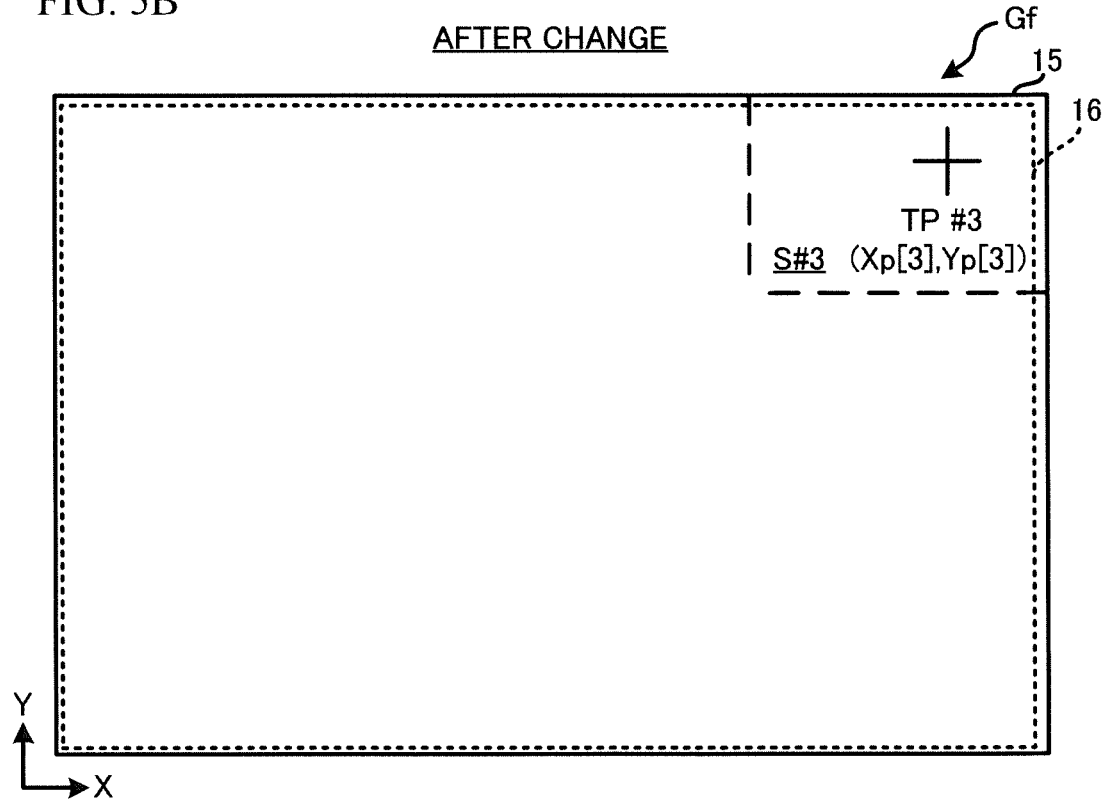

FIGS. 5A and 5B illustrates an operation for changing the target point in the Y direction. In FIGS. 5A and 5B, the same elements as in FIG. 2A are denoted by the same reference numerals, and description thereof is omitted. A mark Ge indicates the screen of the monitor 16 displaying the target point #6 before the change. A mark Gf indicates the screen of the monitor 16 displaying the target point #3 after the change.

When redoing the touch input of the target point #3 located in the +Y side of the target point #6 while the target point #6 is displayed, the user moves the finger in the +Y direction. In this case, the touch input may be inside or outside the region S #6.

When the Y distance Dy exceeds the predetermined value, the determination unit 102 determines that the operation for changing the target point is performed. Further, when the touch input is moved in the +Y direction (Y2>Y1), the determination unit 102 determines that the target point after the change is the target point #3 adjacent to the +Y side of the target point #6.

The display unit 101 deletes the target point #6 and displays the target point #3. The generating unit 103 transmits the acquisition command including the target point number "#3" to the controller 14 according to the result of the touch input, so that the controller 14 acquires the input coordinates of the target point #3 after the change. Therefore, the user can redo the touch input of the target point #3.

In the example shown in FIGS. 5A and 5B, the target point #6 is changed to the target point #3 adjacent to the +Y side thereof. However, by moving the touch input in the −Y direction (Y1>Y2), the target point to be displayed can be changed to another target point adjacent to the −Y side thereof. For example, when the touch input is moved in the −Y direction while selecting the target point #6, the target point #9 at which the touch input is not completed is selected.

Thus, the CPU 10 accepts the change operation of the target point based on the movement direction and the movement distance of the touch input, selects another target point according to the change operation, displays the selected target point on the monitor, and causes the controller 14 to acquire the coordinates of the touch input corresponding to the displayed target point.

For this reason, the user can easily change the target point which is the target position of the touch input, even when the information processing apparatus 1 has no operation means other than the touch panel 15. Therefore, the convenience of the adjustment work of the touch panel 15 is improved.

The CPU 10 determines the movement direction of the touch input based on the X distance and the Y distance, and selects the target point after the change according to the movement direction. In this case, if the coordinates of the start point and the end point are known, the X distance and the Y distance can be calculated. If the user's operation is meandering or slanted, or if it is determined that an operation trajectory has meandered due to the characteristic of the touch panel 15 despite the fact that the user has operated linearly, there is a possibility that the CPU 10 cannot correctly determine the user's operation. However, according to the present embodiment, the operation direction and the movement distance can be identified from the positional relationship between the start point and the end point by excluding the influence of the meandering or the like, and it can be determined that the touch input is the operation for changing the target point. Here, the X distance and the Y distance are examples of values in two directions in the input surface 15a indicative of the movement distance of touch input.

When the CPU 10 causes the controller 14 to acquire again the input coordinates of the touch input corresponding to the target point in which the touch input has been completed in response to the change operation, the CPU 10 changes a display mode of the target point to be displayed on the monitor 16. In the above example, the display color is changed to change the display mode, but is not limited to this example. In other example, a symbol indicative of the target point may be changed.

The user can stop the adjustment work by moving the finger so as to extend the touch input in both the X direction and the Y direction.

Figure 6:
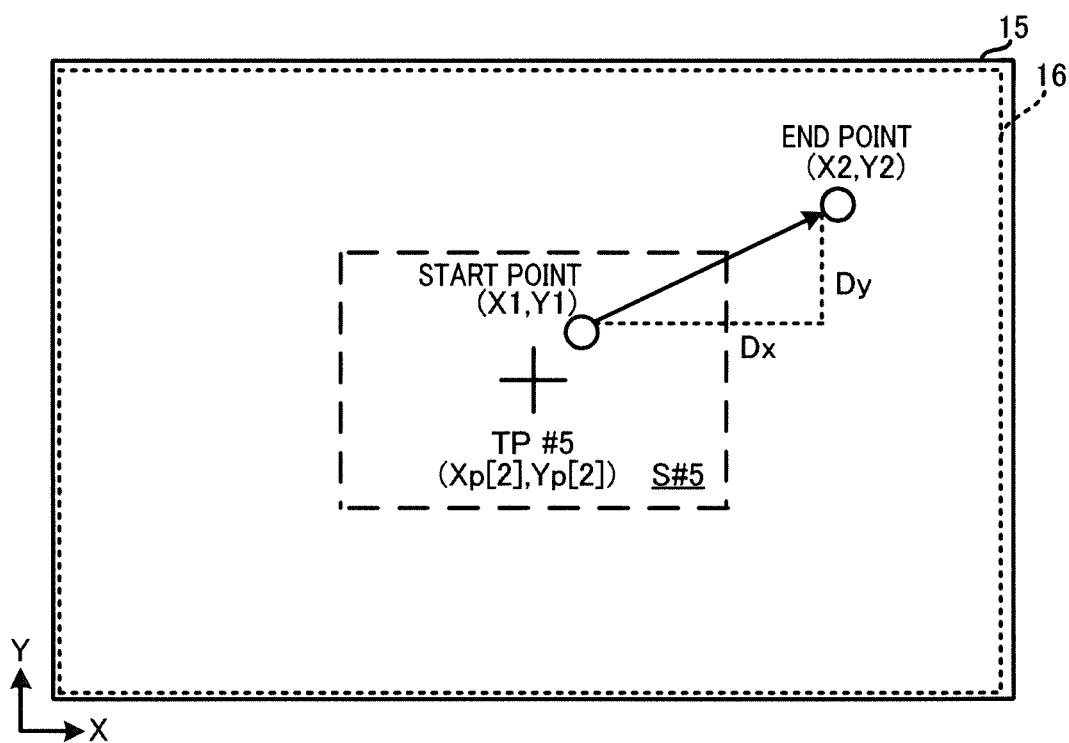
FIG. 6 illustrates a stop operation of adjustment work.

FIG. 6 illustrates a stop operation of the adjustment work. In FIG. 6, the same elements as in FIG. 2A are denoted by the same reference numerals, and description thereof is omitted.

When stopping the adjustment work, the user performs the touch input so as to moves the finger in both of the +X direction and the +Y direction. At this time, the touch input may be inside or outside the region S #6.

When both of the X distance Dx and the Y distance Dy exceed predetermined threshold values, the determination unit 102 determines that the stop operation is performed regardless of the direction of the touch input, and the processing unit 100 stops the selection of the target point. Therefore, the user can stop the adjustment work even if the information processing apparatus 1 does not have any operation means other than the touch panel 15.

Next, a description will be given of the process of the control program executed by the CPU 10.

Figure 7:
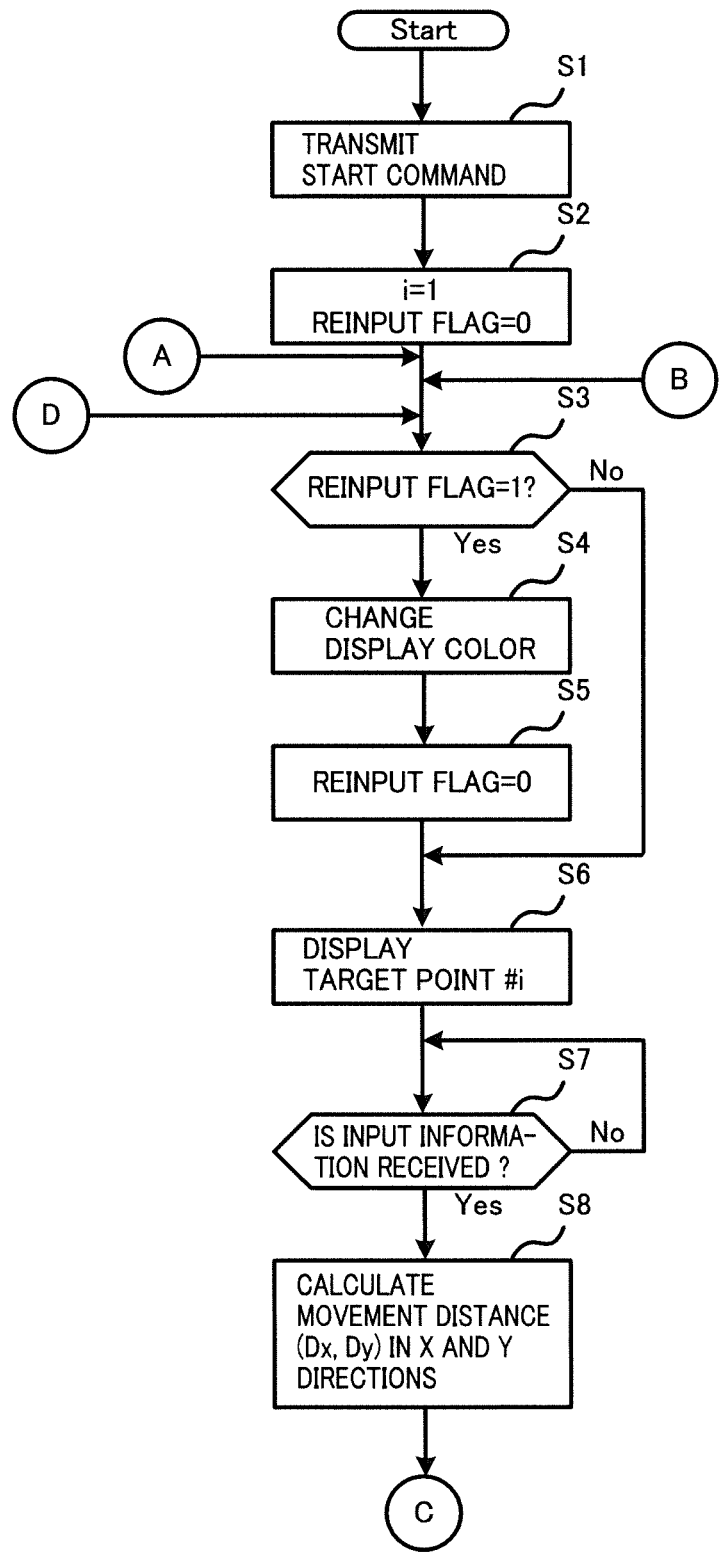
FIG. 7 illustrates a process of a control program.
Figure 8:
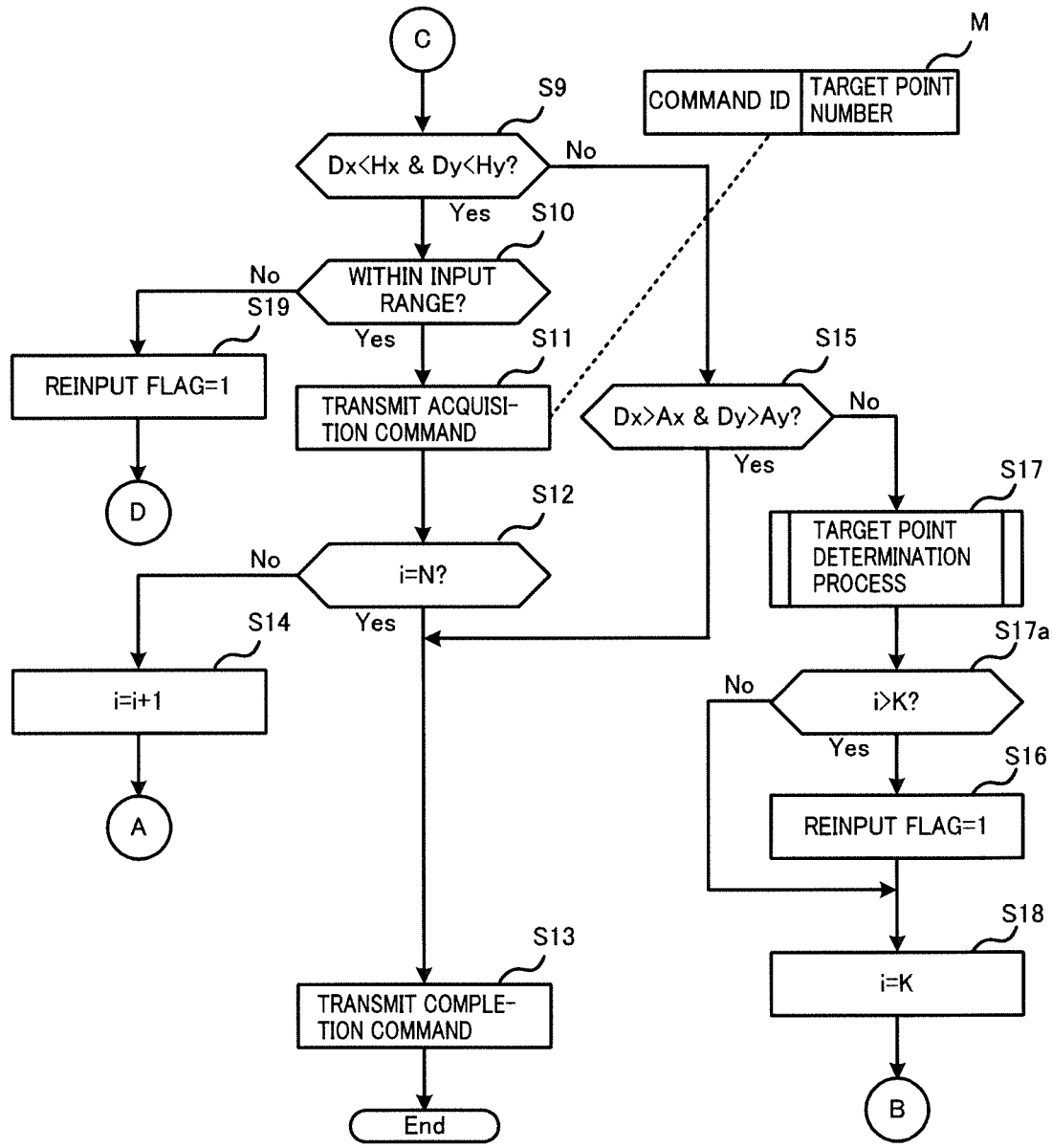
FIG. 8 illustrates the process of the control program.

FIGS. 7 and 8 illustrates the process of the control program. FIGS. 7 and 8 constitute the single process by linking at marks A to D.

When the control program is executed, the generating unit 103 generates the start command and transmits it to the controller 14 (S1). When receiving the start command, the controller 14 switches the operation mode from the normal mode to the adjustment mode. During the adjustment mode, the controller 14 transmits the input coordinates to the CPU 10 without correcting the input coordinates.

Next, the processing unit 100 sets the target point number "i" (i=1, 2, . . . , 9) to "#1" as an initial setting, and sets a reinput flag corresponding to the target point #1 which is a first target of the touch input to "0" (S2). The reinput flag indicates whether the touch input to the selected target point #i has been completed. The reinput flag "0" indicates incompletion of the touch input, and the reinput flag "1" indicates completion of the touch input. When the touch input of the selected target point #i is to be redone, the reinput flag corresponds to the selected target is "1". The target point number to be initially set has no limitation, and the target point #2 or another target point may be set.

The processing unit 100 determines the value of the reinput flag of the selected target point #i (S3). When the reinput flag is "1" (Yes in S3), the display unit 101 changes the setting of the display color of the target point #i (S4). Then, the processing unit 100 sets the reinput flag of the target point #i in which the display color is changed to "0" (S5). When the reinput flag is "0" (No in S3), the processes in S4 and S5 are not performed, and the display color of the target point #i is maintained at the color before the change.

Next, the display unit 101 displays the target point #i on the screen of the monitor 16 in the set display color (S6). The coordinates (Px, Py) of the target point #i are acquired from the table 130. For example, the display unit 101 displays the target point in which the touch input is not completed in red, and displays the target point in which the touch input is completed in green. Therefore, when the target point is displayed in green, the user can recognize that the touch input is to be redone to the target point. Here, the display color changed in S4 returns to the color before the change after displaying the target point #i in S6 and the touch input is redone.

Next, the determination unit 102 determines whether the input information is received from the controller 14 (S7). When the input information is not received (No in S7), the determination unit 102 performs the process of S7 again.

When the input information is received (Yes in S7), the determination unit 102 calculates the X distance Dx and the Y distance Dy from the coordinates (X1, Y1) of the start point of the touch input and the coordinates (X2, Y2) of the end point included in the input information (S8).

Next, the determination unit 102 compares the X distance Dx and the Y distance Dy with predetermined values Hx and Hy, respectively (S9). When Dx<Hx and Dy<Hy are satisfied (Yes in S9), the determination unit 102 determines that the touch input is the touch operation for the target point #i, and determines whether the touch input is within the input range (S10). The determination unit 102 acquires the range of the region S #i from the table 130, and determines whether the coordinates (X1, Y1) and the coordinates (X2, Y2) are within the region S #i.

When the determination unit 102 determines that the touch input is out of the input range (No in S10), the reinput flag is set to "1" (S19), and the process of S3 is performed again. In this case, the acquisition command is not transmitted to the controller 14, and the controller 14 does not acquire the input coordinates until the touch input is performed again.

When the determination unit 102 determines that the touch input is within the input range (Yes in S10), the generating unit 103 generates the acquisition command and transmits it to the controller 14 (S11). An acquisition command M in FIG. 8 includes a command ID as its identifier, and the target point number in which the touch input is performed. The processor 140 determines that the received command is the acquisition command M based on the command ID, and stores the coordinates of the touch input in the memory 141 as the input coordinates corresponding to the target point number indicated in the acquisition command M.

Next, the processing unit 100 determines whether the target point number matches a maximum number N (9 in this example) (S12). That is, the processing unit 100 determines whether the touch input corresponding to the last target point #9 is completed.

When the target point number is not the maximum number N (No in S12), the processing unit 100 adds 1 to the target point number (S14). Then, each process in S3 and the subsequent step is performed. Thereby, the input coordinates of the touch input corresponding to the next target point #(i+1) are acquired. If the target point #(i+1) is the target point in which the touch input is not performed, the reinput flag corresponding to the target point #(i+1) is "0".

When the target point number reaches the maximum number N (Yes in S12), the generating unit 103 generates a completion command and transmits it to the controller 14 (S13). The controller 14 returns the operation mode to the normal mode when receiving the completion command. Then, the process of the control program is completed. Here, as long as all the target points are selected, it is not necessary to determine whether the target point number has reached the maximum number N as illustrated in S12 to determine the process completion.

In the adjustment mode described above, the CPU 10 sequentially selects one of the target points #1 to #9 to display it on the monitor 16, and the controller 14 acquires the coordinates of the touch input corresponding to the selected target point.

When at least one of Dx≥Hx and Dy≥Hy is satisfied (No in S9), the determination unit 102 determines that the touch input is not the touch operation with respect to the target point #i, and compares the X distance Dx and Y The distance Dy with threshold values Ax and Ay, respectively (S15). When Dx>Ax and Dy>Ay are satisfied (Yes in S15), the determination unit 102 determines that the touch input is the stop operation of the adjustment work, and the generating unit 103 transmits the completion command to the controller 14 according to the determination result (S13). Then, the process of the control program is completed.

When only one of Dx>Ax and Dy>Ay is satisfied (No in S15), the determination unit 102 determines that the touch input is the operation for changing the target point #i, and performs a target point determination process (S17) to determine a target point #K to be displayed after the change. The target point determination process will be described later.

Next, the processing unit 100 compares the target point number of the selected target point #i with the target point number of the target point #K determined by the target point determination process (S17a). When i>K is satisfied (Yes in S17a), the processing unit 100 determines that the target point in which the input determination has been performed is selected again, and sets the reinput flag corresponding to the target point #K to "1" (S16). That is, when the touch input corresponding to the target point #K is completed once, the processing unit 100 sets the reinput flag to "1". On the contrary, when i<K is satisfied (No in S17a), the processing unit 100 determines that the target point in which the touch input is not completed is selected, and keeps the reinput flag as "0". Since the same target point is not selected again, i=K is not satisfied.

Next, the processing unit 100 sets the selected target point #i as the determined target point #K (S18). Thereby, the target point to be displayed is changed from the target point #i to the target point #K. In this way, the processing of the control program is performed.

Figure 9:
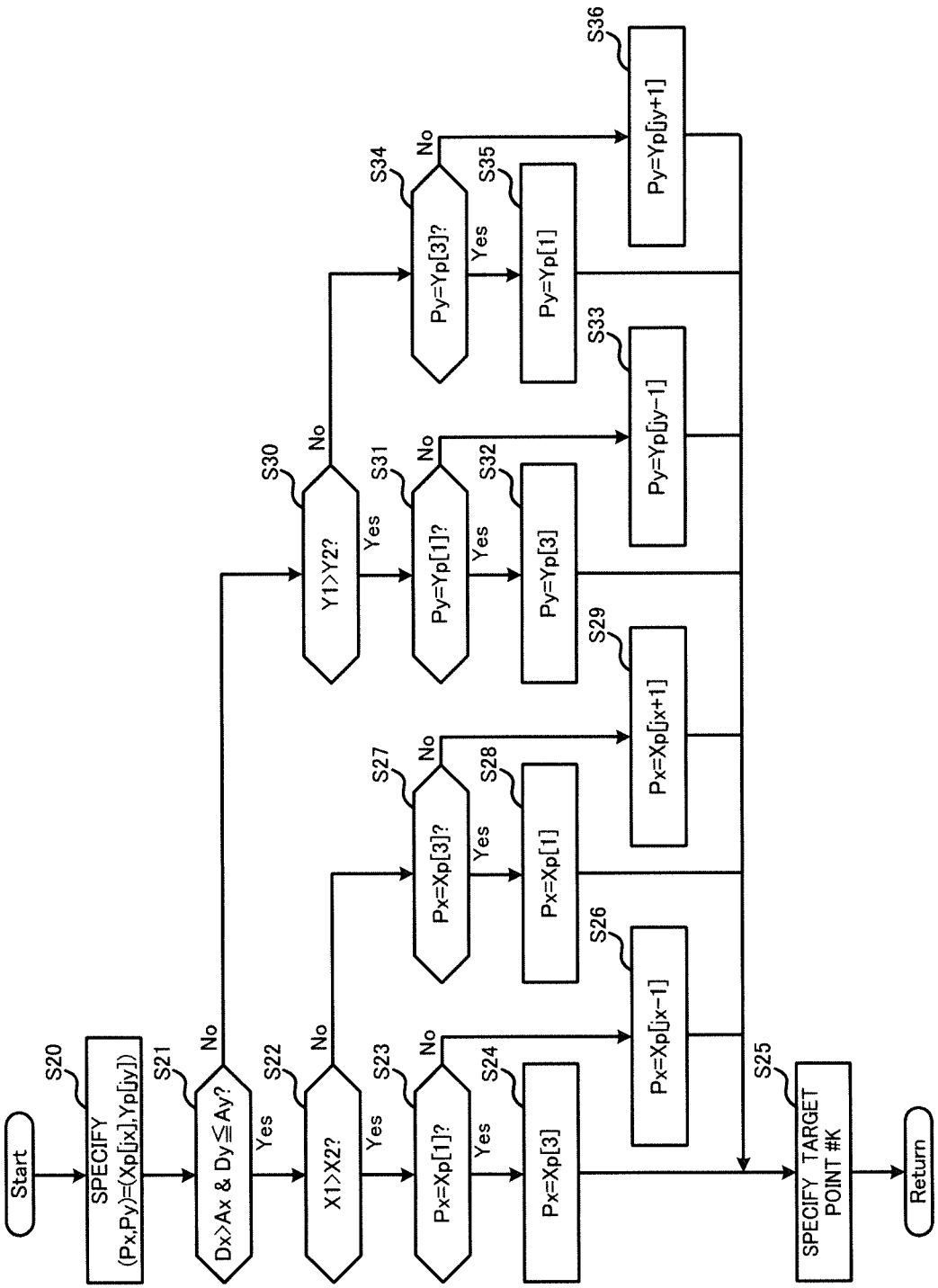
FIG. 9 illustrates a target point determination process.

FIG. 9 illustrates the target point determination process of S17. In the following, it is assumed that the selected target point is #i and the target point after the change is #K.

The determination unit 102 specifies the coordinates (Px, Py)=(Xp [jx], Yp [jy]) (jx, jy=1, 2, 3) of the target point #i (S20). For example, the determination unit 102 acquires the coordinates (Px, Py) of the target point #i from the table 130, and acquires the variables jx, jy corresponding to the coordinates (Px, Py). Since the coordinates (Px, Py) of the target point #5 are (Xp [2], Yp [2]), the determination unit 102 acquires jx=2 and jy=2 as the variables of the target point #5.

Next, the determination unit 102 compares the X distance Dx and the Y distance Dy with the threshold values Ax and Ay, respectively (S21). When Dx>Ax and Dy≤Ay are satisfied (Yes in S21), the determination unit 102 determines that the movement direction of the touch input is the X direction, and further compares the X coordinate X1 of the start point with the X coordinate X2 of the end point in order to specify which of the +X direction and the −X direction the movement direction of the touch input is (S22).

When X1>X2 is satisfied (Yes in S22), the determination unit 102 determines that the movement direction of the touch input is the −X direction, and determines whether the X coordinate Px of the target point #i is Xp [1] (S23). When the X coordinate Px of the target point #i is the Xp [1] (Yes in S23), the determination unit 102 determines that the touch input is the operation for selecting the target point in which the variable jx of the X coordinate is "3" since no target point is adjacent to the −X side of the target point #i, and sets the X coordinate Px of the target point #K after the change to Xp [3] (S24).

Next, the determination unit 102 specifies the target point #K whose coordinates (Px, Py) are (Xp [3], Yp [jy]) from the table 130 (S25). When the target point #i is the target point #4 (Xp [1], Yp [2]), the target point #K is specified as the target point #6 (Xp [3], Yp [2]).

When the X coordinate Px of the target point #i is not the Xp [1] (No in S23), the determination unit 102 sets the coordinate Px to Xp [jx−1] so that the target point #K adjacent to the −X side of the target point #i is selected (S26).

Next, the determination unit 102 specifies the target point #K whose coordinates (Px, Py) are (Xp [jx−1], Yp [jy]) from the table 130 (S25). When the target point #i is the target point #5 (Xp [2], Yp [2]), the target point #K is specified as the target point #4 (Xp [1], Yp [2]).

When X1<X2 is satisfied (No in S22), the determination unit 102 determines that the touch input moves in the +X direction, and determines whether the X coordinate Px of the target point #i is the Xp [3] (S27). When the X coordinate Px of the target point #i is the Xp [3] (Yes in S27), the determination unit 102 sets the X coordinate Px of the target point #K as the Xp [1] (S28) since no target point is adjacent to the +X side of the target point #i. Since the same target point #i is not selected again, X1=X2 is not satisfied.

Next, the determination unit 102 specifies the target point #K whose coordinates (Px, Py) are (Xp [1], Yp [jy]) from the table 130 (S25). When the target point #i is the target point #4, the target point #K is specified as the target point #5.

When the X coordinate Px of the target point #i is not the Xp [3] (No in S27), the determination unit 102 sets the coordinate Px to Xp [jx+1] so that the target point #K adjacent to the +X side of the target point #i is selected (S29).

Next, the determination unit 102 specifies the target point #K whose coordinates (Px, Py) are (Xp [jx+1], Yp [jy]) from the table 130 (S25). When the target point #i is the target point #5, the target point #K is specified as the target point #6.

When Dx≤Ax and Dy>Ay are satisfied (No in S21), the determination unit 102 determines that the movement direction of the touch input is the Y direction, and further compares the Y coordinate Y1 of the start point with the Y coordinate Y2 of the end point in order to specify which of the +Y direction and the −Y direction the movement direction of the touch input is (S30).

When Y1>Y2 is satisfied (Yes in S30), the determination unit 102 determines that the movement direction of the touch input is the −Y direction, and determines whether the Y coordinate Py of the target point #i is Yp [1] (S31). When the Y coordinate Py of the target point #i is the Yp [1] (Yes in S31), the determination unit 102 sets the Y coordinate Py of the target point #K to Yp [3] (S32) since no target point is adjacent to the −Y side of the target point #i.

Next, the determination unit 102 specifies the target point #K whose coordinates (Px, Py) are (Xp [jx], Yp [3]) from the table 130 (S25). When the target point #i is the target point #7, the target point #K is specified as the target point #1.

When the Y coordinate Py of the target point #i is not the Yp [1] (No in S31), the determination unit 102 sets the coordinate Py to Yp [jy−1] so that the target point #K adjacent to the −Y side of the target point #i is selected (S33).

Next, the determination unit 102 specifies the target point #K whose coordinates (Px, Py) are (Xp [jx], Yp [jy−1]) from the table 130 (S25). When the target point #i is the target point #4, the target point #K is specified as the target point #7.

When Y1<Y2 is satisfied (No in S30), the determination unit 102 determines that the touch input moves in the +Y direction, and determines whether the Y coordinate Py of the target point #i is the Yp [3] (S34). When the Y coordinate Py of the target point #i is the Yp [3] (Yes in S34), the determination unit 102 sets the Y coordinate Py of the target point #K to the Yp [1] (S35) since no target point is adjacent to the +Y side of the target point #i. Since the same target point #i is not selected again, Y1=Y2 is not satisfied.

Next, the determination unit 102 specifies the target point #K whose coordinates (Px, Py) are (Xp [jx], Yp [1]) from the table 130 (S25). When the target point #i is the target point #1, the target point #K is specified as the target point #7.

When the Y coordinate Py of the target point #i is not the Yp [3] (No in S34), the determination unit 102 sets the coordinate Py to Yp [jy+1] so that the target point #K adjacent to the +Y side of the target point #i is selected (S36).

Next, the determination unit 102 specifies the target point #K whose coordinates (Px, Py) are (Xp [jx], Yp [jy+1]) from the table 130 (S25). When the target point #i is the target point #4, the target point #K is specified as the target point #1. In this way, the target point determination process is performed.

Thus, the CPU 10 accepts the change operation of the target point based on the movement distance from the start point to the end point of the touch input, selects another target point according to the change operation, displays the selected target point on the screen of the monitor 16, and causes the controller 14 to acquire the input coordinates of the another target point.

Also, the CPU 10 determines the movement direction of the touch input based on the X distance Dx and the Y distance Dy, and selects the another target point according to the movement direction. At this time, since the CPU 10 compares the X distance Dx and the Y distance Dy with the threshold values Ax and Ay, respectively, the movement direction of the touch input can be determined with high accuracy even if the user's touch input is meandering or slanted.

Figure 10:
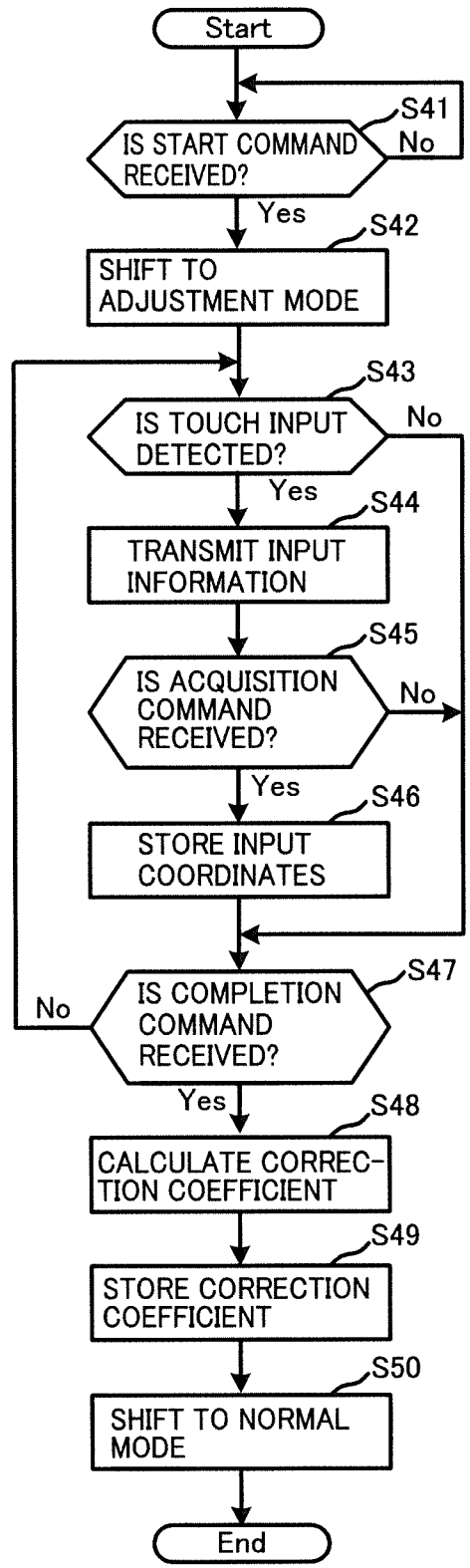
FIG. 10 illustrates the operation of an adjustment mode of a controller.

FIG. 10 illustrates the operation of the adjustment mode of the controller 14. The processor 140 determines whether the start command is received from the CPU 10 (S41). When the start command is not received (No in S41), the processor 140 performs the process of S41 again.

When the start command is received (Yes in S41), the processor 140 shifts the operation mode to the adjustment mode (S42). Next, the processor 140 determines whether the touch input is detected (S43). When the touch input is detected (Yes in S43), the processor 140 acquires the input coordinates of the touch input, and then transmits input information including the input coordinates to the CPU 10 (S44). Here, the input coordinates included in the input information are not corrected.

Next, the processor 140 determines whether the acquisition command is received from the CPU 10 (S45). When the acquisition command is received (Yes in S45), the processor 140 stores the input coordinates in association with the target point number in the acquisition command into the memory 141 (S46).

Next, the processor 140 determines whether the completion command is received from the CPU 10 (S47). The process of S47 is also performed when the touch input is not detected (No in S43) or the acquisition command is not received (No in S45). When the completion command is not received (No in S47), each process in S43 and the subsequent step is performed again.

Next, the processor 140 calculate the correction coefficient from the input coordinates corresponding to each of the target points #1 to #9 stored in the memory 141 (S48). Next, the processor 140 stores the correction coefficient in the memory 141 (S49), and shifts the operation mode to the normal mode (S50). In this way, the controller 14 executes the operation of the adjustment mode.

Thus, the controller 14 acquires the coordinates of the touch input corresponding to each of the target points #1 to #9 in the input surface 15a to calculate the correction coefficient of the coordinates.

Figure 11:
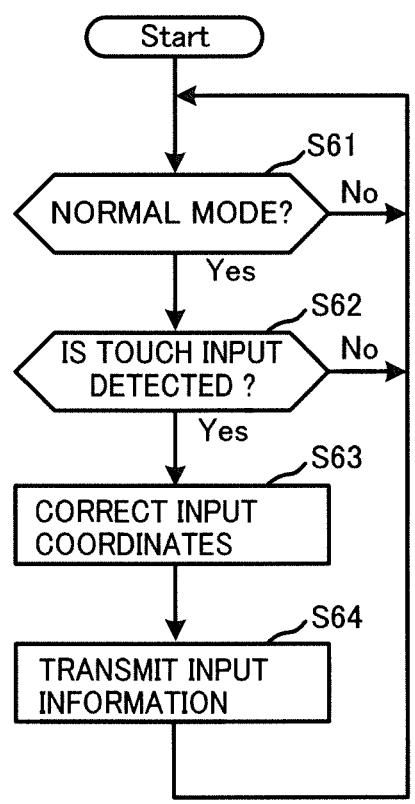
FIG. 11 illustrates the operation of a normal mode of the controller.

FIG. 11 illustrates the operation of the normal mode of the controller 14. The processor 140 determines whether the operation mode is the normal mode or the adjustment mode (S61). When the operation mode is the adjustment mode (No in S61), the process of S61 is performed again.

When the operation mode is the normal mode (Yes in S61), the processor 140 determines whether the touch input is detected (S62). When the touch input is not detected (No in S62), the process of S61 is performed again.

When the touch input is detected (Yes in S62), the processor 140 acquires the input coordinates of the touch input, and corrects the input coordinates based on the correction coefficient stored in the memory 141 (S63). Next, the processor 140 transmits the input information including the corrected input coordinates to the CPU 10 (S64). The CPU 10 can execute an application using the touch input. Then, each process of S61 and the subsequent step is performed again.

As described above, in the information processing apparatus 1 of the present embodiment, the CPU 10 acquires the coordinates of the touch input, and determines the content of the operation with respect to the touch panel 15 based on at least one of the determined direction and the determined movement distance of the touch input. Even if the information processing apparatus 1 does not have the input means other than the touch panel 15, it is possible to easily determine the operation content and the operation intention by the user based on the input operation from the touch panel 15, and improve convenience of the adjustment work or the like of the touch panel 15.

The CPU 10 selects a single target point from the plurality of target points, displays the selected target point on the monitor 16, and causes the controller 14 to acquire the coordinates of the touch input or changes selection of the target point, based on the determined operation content. Therefore, the information processing apparatus 1 can distinguish and receive the touch operation with respect to the target point and the change operation for changing the target point according to the operation content and the operation intention by the user.

The above-mentioned processing functions can be realized by a computer. In this case, a program in which the process for realizing the functions to be performed by the computer is written is provided. By executing the program on the computer, the processing functions are realized by the computer. Such program may be recorded on a non-transitory computer-readable recording medium (however, a carrier wave is excluded).

When the program is distributed, a removable recording medium such as a DVD (Digital Versatile Disc) or a CD-ROM (Compact Disc Read Only Memory) in which the program is recorded is sold. Further, the program may be stored in a memory device of a server computer and transferred from the server computer to another computer via a network.

The computer which runs the program may store the program recorded in the removable recording medium or transferred from the server computer into a memory device of the computer. Then the computer reads the program from the memory device of the computer, and runs the process according to the program. Incidentally, the computer may read the program directly from the removable recording medium and run the process according to the program. Further, every time the program is transferred from the server computer, the computer may successively run the process according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An information processing apparatus comprising:
   a touch panel having an input surface divided into a plurality of regions including a plurality of target points, respectively;
   a memory;
   a monitor overlapping the touch panel;
   a first processor coupled to the memory;
   a second processor configured to:
      acquire coordinates of a touch input corresponding to each of the plurality of target points in the input surface to calculate a correction value of the coordinates of the touch input in the input surface;
   the first processor configured to:
      select a single target point sequentially from among the plurality of target points to display the selected single target point on the monitor;
      acquire the coordinates of the touch input in the input surface of the touch panel;
      determine a direction of the touch input and a movement distance from a start point to an end point of the touch input; and
      determine an operation content with respect to the touch panel based on at least one of the direction and the movement distance of the touch input,
         the operation content including a touch operation on the selected single target point on the monitor for obtaining the correction value and a change operation for changing the selected single target point to other single target point from among the plurality of target points.

2. The information processing apparatus as claimed in claim 1,
   wherein the first processor causes the second processor to acquire the coordinates of the touch input based on a determination result of the touch operation, or changes selection of the selected single target point to the other single target point and inhibits the second processor from acquiring the coordinates of the touch input corresponding to the selected single target point based on a determination result of the change operation.

3. The information processing apparatus as claimed in claim 2, wherein
   when the movement distance is more than a threshold value, the first processor selects the other single target point from among the plurality of target points to display the selected other target point on the monitor.

4. The information processing apparatus as claimed in claim 3, wherein
   when the touch input corresponding to the selected single target point is out of a region, from among the regions, including the selected single target point, the first processor inhibits the second processor from acquiring the coordinates of the touch input corresponding to the selected single target point.

5. The information processing apparatus as claimed in claim 2, wherein when the movement distance exceeds the threshold value in two directions in the input surface, the first processor stops selecting the single target point from among the plurality of target points.

6. A non-transitory computer-readable recording medium storing a program that causes a computer to execute a process, the computer including a touch panel having an input surface divided into a plurality of regions including a plurality of target points, respectively, a monitor overlapping the touch panel, and a controller acquiring coordinates of a touch input corresponding to each of the plurality of target points in the input surface to calculate a correction value of the coordinates of the touch input in the input surface, the process comprising:

selecting a single target point sequentially from among the plurality of target points to display the selected single target point on the monitor;

determine a direction of the touch input and a movement distance from a start point to an end point of the touch input;

determine an operation content with respect to the touch panel based on at least one of the direction and the movement distance of the touch input, the operation content including a touch operation on the selected single target point on the monitor for obtaining the correction value and a change operation for changing the selected single target point to other single target point from among the plurality of target points; and causing the controller to acquire the coordinates of the touch input corresponding to the selected single target point based on a determination result of the touch operation, or changing selection of the single target point to the other single target point and inhibiting the controller from acquiring the coordinates of the touch input corresponding to the selected single target point based on determination result of the change operation.

7. A control method of controlling a computer, the computer including a touch panel, a monitor overlapping the touch panel having an input surface divided into a plurality of regions including a plurality of target points, respectively, and a controller acquiring coordinates of a touch input corresponding to each of the plurality of target points in the input surface to calculate a correction value of the coordinates of the touch point in the input surface, the method comprising:

selecting a single target point sequentially from among the plurality of target points to display the selected single target point on the monitor;

determine a direction of the touch input and a movement distance from a start point to an end point of the touch input;

determine an operation content with respect to the touch panel based on at least one of the direction and the movement distance of the touch input, the operation content including a touch operation on the selected single target point on the monitor for obtaining the correction value and a change operation for changing the selected single target point to other single target point from among the plurality of target points; and causing the controller to acquire the coordinates of the touch input corresponding to the selected single target point based on a determination result of the touch operation, or changing selection of the target point to the other single target point and inhibiting the controller from acquiring the coordinates of the touch input corresponding to the selected single target point based on a determination result of the change operation.

* * * * *